United States Patent Office 2,825,493
Patented Mar. 4, 1958

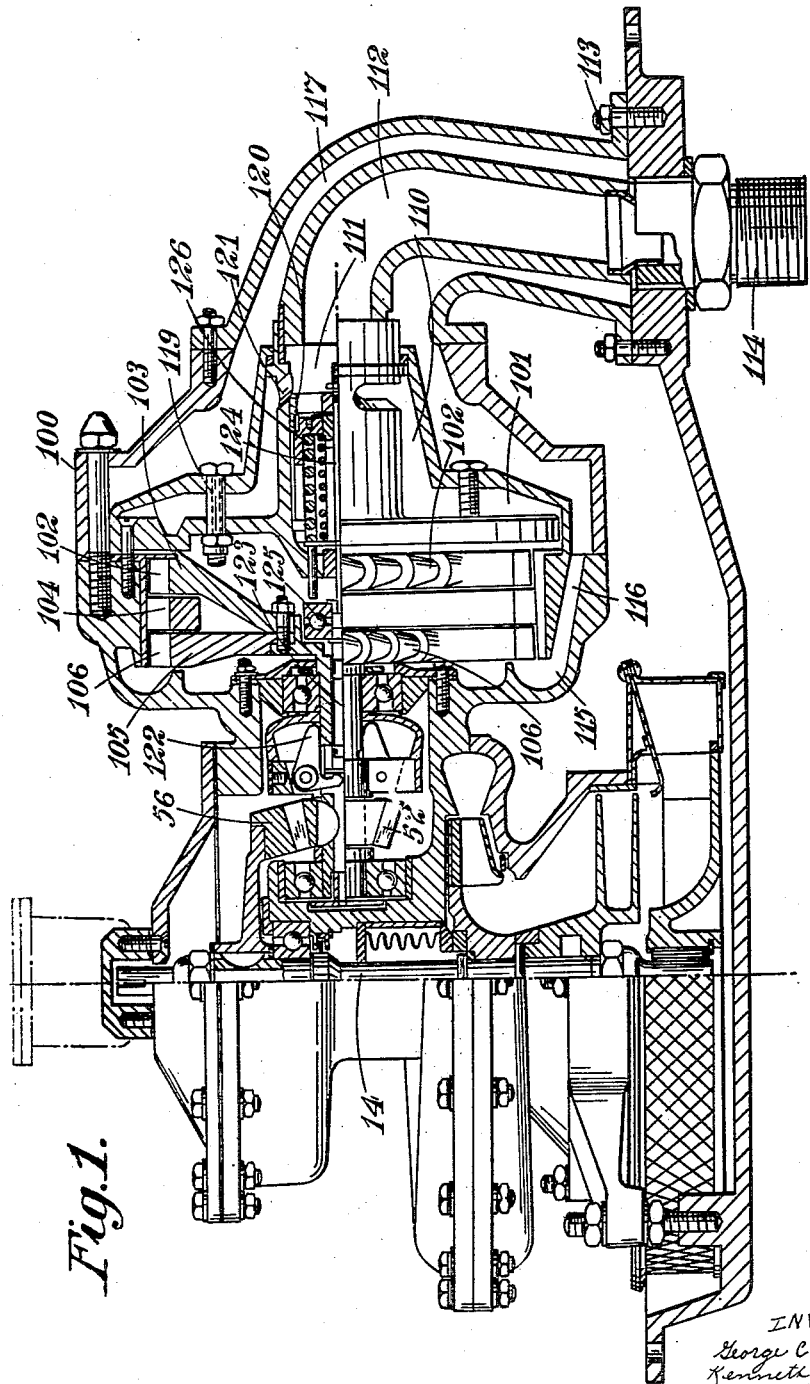

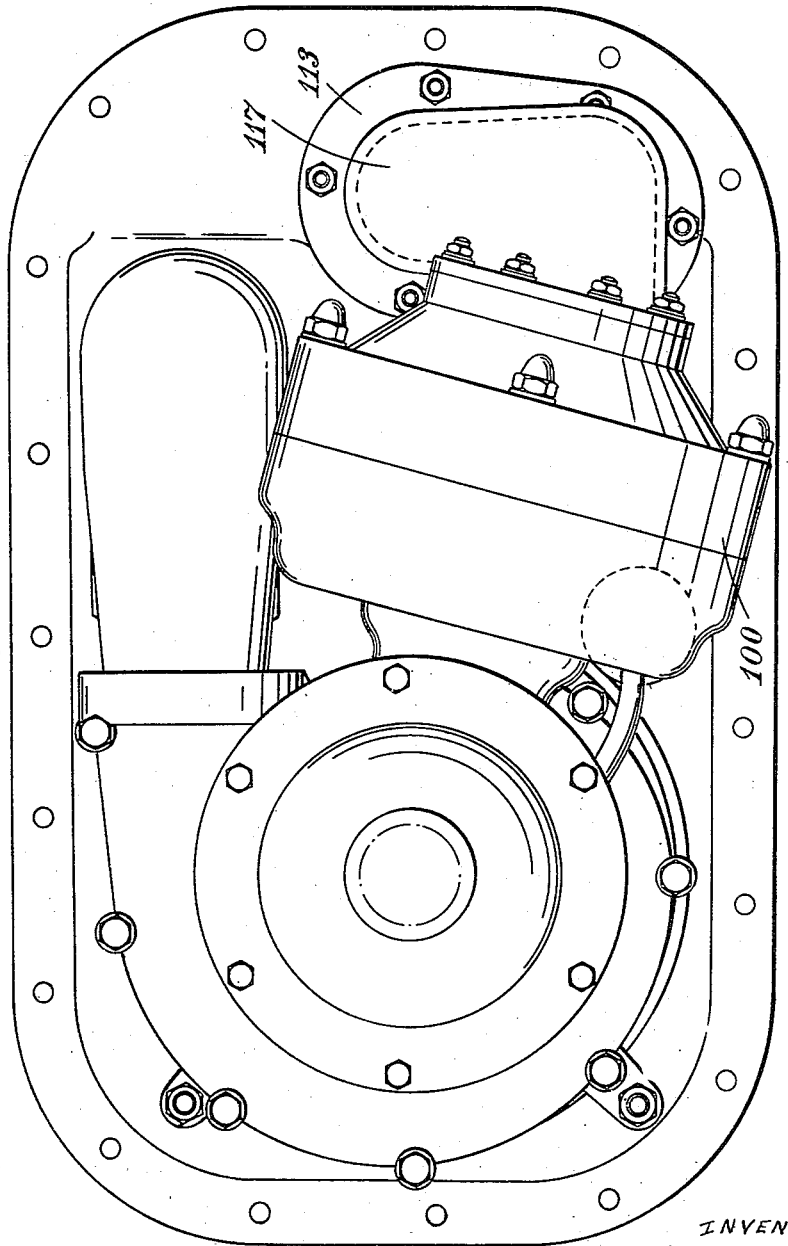

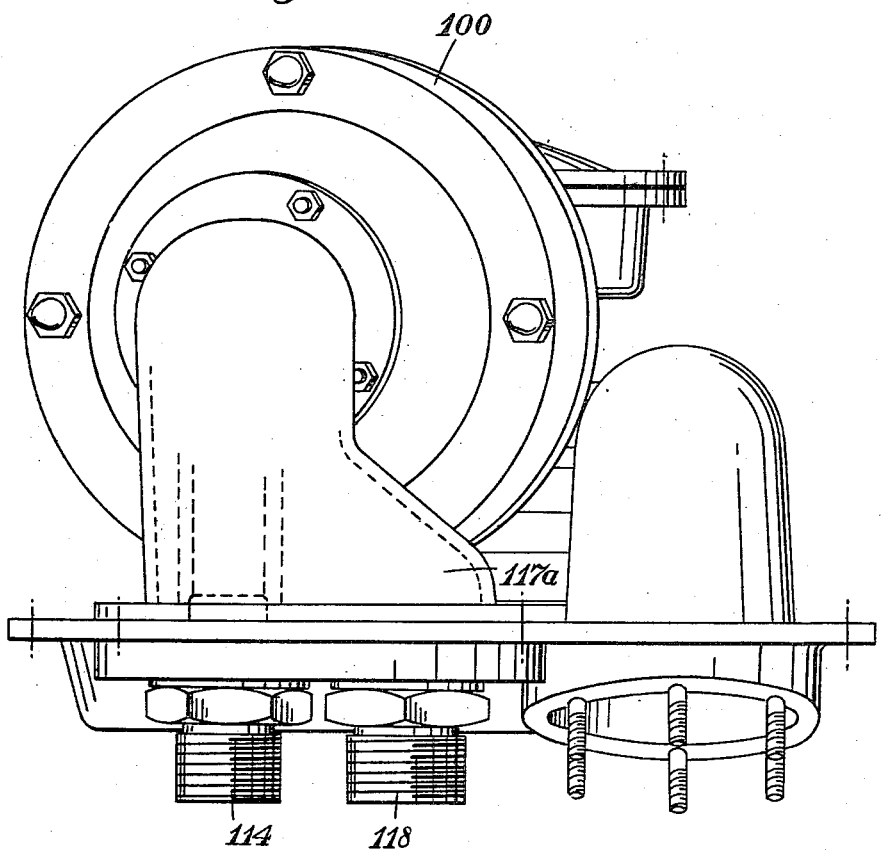

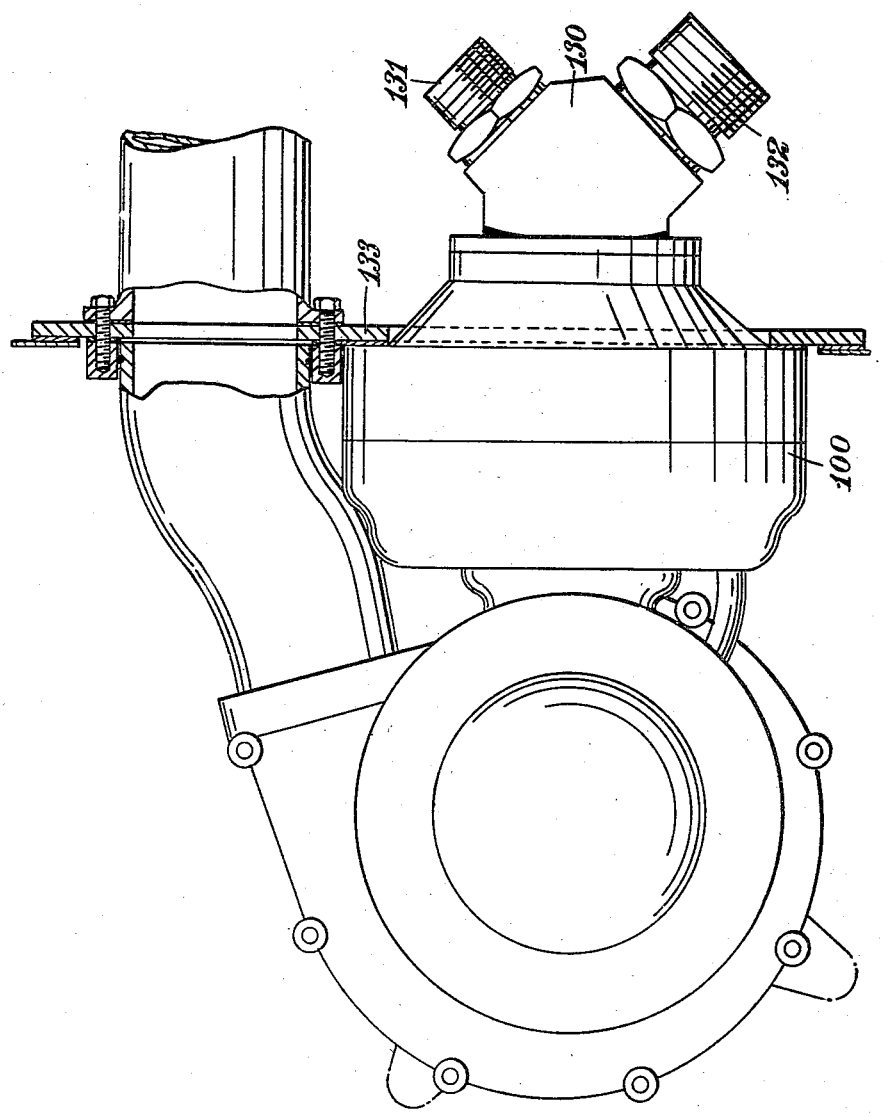

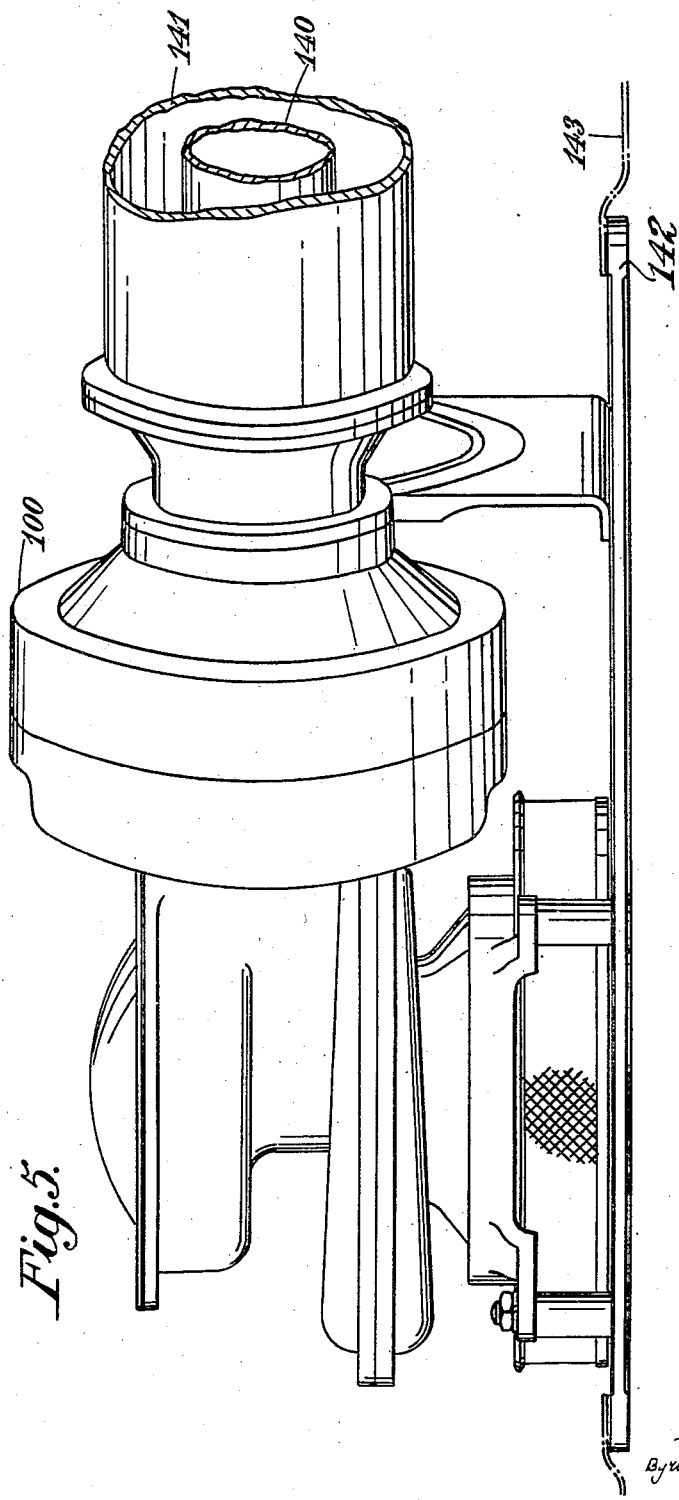

2,825,493

COMPRESSED AIR-DRIVEN TURBINES

George Charles Meredew, London, England, Kenneth Victor William Berris, Adelaide, South Australia, and Frederick Edward Samuel Smedley, Beeston, England, assignors to Bernard Bercovitz, Leaside, Ontario, Canada, and Rolls-Royce Limited, Derby, England, a British company Application February 11, 1953, Serial No. 336,377

Claims priority, application Great Britain February 26, 1952

4 Claims. (Cl. 222—334)

The invention relates to compressed-air-driven turbines intended for submersion in liquids (e. g. a volatile fuel).

In practice the air supply to the turbine usually has a temperature which is greater than that of the liquid and as it is necessary to convey the air through the liquid to the submersed turbine there is usually a transfer of heat from the air to the liquid. This heat transfer is undesirable and it is an object of the invention to reduce or eliminate such transfer. To achieve this object the invention takes advantage of the fact that the air used for driving the turbine is cooler after expansion than the incoming high pressure air.

According to the invention in one of its forms a compressed-air-driven turbine of the above kind is characterised by the feature that the air outlet conduit is constructed as a jacket around the turbine. The turbine may also have air inlet and outlet conduits for conveying the inlet and outlet air through the liquid and be characterised by the fact that, in the vicinity of the turbine, the air outlet conduit is constructed as a jacket around the air inlet conduit so that the exhaust air serves as a shroud for the incoming air and reduces or eliminates loss of heat from the incoming air to the liquid.

In a preferred form of the invention the turbine is arranged for axial flow of the air and the air leaving the turbine blades is taken in the opposite axial direction through a shroud around the outside of the turbine into the outlet conduit. It is also preferred that the inlet and exhaust conduits are separated at a fitting for attachment to a wall (e. g. the bottom) of a tank for the liquid and providing separate connections for external pipes.

One specific construction of a turbine according to the invention and some modifications thereof will now be described by way of example and with reference to the accompanying drawings in which:

Figure 1 is a section through the turbine and a part section through a pump driven thereby, Figure 2 is a plan view of the turbine and pump shown in Figure 1, Figure 3 is a side view of the turbine and pump, Figure 4 is a plan view of a modified form of turbine and pump, and Figure 5 is a side view of a further modified form of turbine and pump.

The turbine forming the subject of this example is arranged to drive a fuel pump constructed as described in the specification of continuation-in-part application No. 249,250, filed October 2, 1951 (now Patent No. 2,721,677), with reference to Figure 3 of the drawings. The turbine replaces the electric motor and drives the pump spindle 14 through gearing 52, 56, the axis of rotation of the turbine being normally horizontal. The turbine 100 is arranged for axial flow of the air in the direction towards the pump and has an annular ring of nozzles 101 directing the air on to the blades 102 of the first turbine wheel 103, a fixed ring of reaction blades 104 through which the air passes after leaving the first turbine wheel, and a second wheel 105 having blades 106 onto which the air is then directed. The turbine casing is formed with an annular conduit 110 leading to the ring of nozzles 101 and provided with an axially directed inlet 111 on the side of the casing remote from the pump. This inlet leads through a right-angle elbow 112 to a fitting 113 for attachment to the bottom wall of the tank and for connection through the bottom to an air supply pipe 114.

At the outlet end of the turbine the casing provides an annular ring 115 for the exhaust air which diverts the air through 180° outwardly into a shroud 116 around the turbine and around the air inlet 110. This shroud leads to an outlet elbow 117 which also surrounds the inlet elbow 112 and is connected to the aforesaid fitting. At this fitting the exhaust shroud has a sideways extension 117a which is connected through the fitting to an independent exhaust outlet pipe 118 outside the tank. The arrangement ensures that the hot incoming air is completely shrouded from the fuel in the tank by the cooler outgoing air.

A bleed connection is provided between the inside of the turbine and gear casing and the exhaust shroud. The connection is provided by the central passageway through the tubular bolt 119.

The turbine is provided with a governor and control valve as shown or modified as described in our specification United States Patent No. 2,782,001, filed February 11, 1953. In the construction shown in the present drawings there is a sleeve valve 120 co-operating with ports 121 to control the incoming air and there are centrifugal weights 122 which operate through a two-part push-rod to move the valve sleeve axially. The push rod passes through the spindle of the turbine and the part 123 rotates with the spindle. The other part, 124, of the rod does not rotate and the thrust is transmitted between the parts by a ball bearing 125. A spring 126 urges the valve against the action of the weights.

In the modified form of the above example shown in Figure 4 the elbows 112 and 117 are replaced by a fitting 130 in which there is an internal air inlet pipe extending axially from the annular inlet conduit 110 to an air inlet connection 131 and the exhaust shroud surrounds the inlet pipe and leads to an outlet 132. In the construction shown the fitting 130 is of Y form but it may, if desired, be of T form. The fitting is outside the tank 134, the inlet side of the turbine casing protruding through an opening in a cover plate 133 for an aperture in a side wall of the tank. Alternatively the turbine casing may abut against the cover plate and the nested tubes pass through the plate.

Figure 5 shows a further alternative in which the elbows 112 and 117 are replaced by two straight flexible pipes 140 and 141. The pipe 140 is the inlet pipe and the pipe 141 is the exhaust pipe. The unit shown in this figure is supported from a plate 142 secured over an aperture in the bottom wall 143 of a tank.

The constructions forming the subject of the above examples are intended for use as booster pumps submerged in the fuel in fuel tanks of jet propelled aircraft. The air for driving the turbine in such an installation, is derived from the jet engine and may have a temperature of 200° C. or higher. Consequently it is important to avoid, so far as is practicable, transfer of heat from the incoming air to the fuel.

We claim:

1. In combination with an aircraft fuel tank having a fuel pump for delivering fuel from the tank, a compressed-air-driven turbine mounted within the tank in driving connection with the pump and located for submersion in the fuel, said turbine comprising a turbine rotor, a casing around the rotor having nozzles at one end for directing compressed air onto the rotor, an outlet for exhaust air at the other end of the casing and a jacket around the casing open to the outlet and leading to a discharge conduit for the exhaust air.

2. In combination with an aircraft fuel tank having a fuel pump for delivering fuel from the tank, a compressed-air-driven turbine as claimed in claim 1, said turbine having an air inlet conduit leading to the nozzles, the said discharge conduit surrounding the inlet conduit.

3. In combination with an aircraft fuel tank having a fuel pump for delivering fuel from the tank, a compressed-air-driven turbine mounted within the tank in driving connection with the pump and located for submersion in the fuel, said turbine comprising a turbine rotor, a casing around the rotor having nozzles for directing compressed air onto the rotor, an air inlet conduit leading to the nozzles and an air outlet conduit leading from the casing, both said inlet conduit and said outlet conduit being located within the tank for submersion in the fuel and said inlet conduit being, for at least a part of its length, within and surrounded by, the outlet conduit.

4. In combination with an aircraft fuel tank having a fuel pump for delivering fuel from the tank, a compressed-air-driven turbine as claimed in claim 3 in which the inlet and outlet conduits are connected to a fitting for attachment to a wall of a tank for the liquid and provided with separate connections for pipes outside each other.

References Cited in the file of this patent

UNITED STATES PATENTS

| | | |
|---|---|---|
| 641,074 | Burgum | Jan. 9, 1900 |
| 1,653,217 | Koch | Dec. 20, 1927 |
| 1,864,742 | Koch | June 28, 1932 |
| 2,492,966 | Ckola | Jan. 3, 1950 |
| 2,694,980 | Lauck et al. | Nov. 23, 1954 |

FOREIGN PATENTS

| | | |
|---|---|---|
| 664,616 | Great Britain | Jan. 9, 1952 |
| 810,898 | Germany | Aug. 13, 1951 |